United States Patent [19]

Nakagawa et al.

[11] Patent Number: 4,948,508
[45] Date of Patent: Aug. 14, 1990

[54] SURFACE-HYDROPHILIC, HIGHLY SELECTIVE SEMIPERMEABLE MEMBRANE

[75] Inventors: Tsutomu Nakagawa, Musashino; Akon Higuchi, Edogawa, both of Japan

[73] Assignee: Asahi Kasei Kogyo Kabushiki Kaisha, Osaka, Japan

[21] Appl. No.: 341,217

[22] Filed: Apr. 21, 1989

[30] Foreign Application Priority Data

May 10, 1988 [JP] Japan ................... 63-111571

[51] Int. Cl.$^5$ .............. B01D 61/02; B01D 61/14; B01D 61/24
[52] U.S. Cl. .................. 210/500.33; 210/500.36
[58] Field of Search ............. 210/500.27, 500.28, 210/500.21, 500.23, 500.33, 500.35, 500.36

[56] References Cited

U.S. PATENT DOCUMENTS 3,957,651  5/1976  Kesting ................. 210/500.28
4,704,321  11/1987  Davis et al. ........... 210/500.27
4,839,203  6/1989  Davis et al. ........... 210/500.27

FOREIGN PATENT DOCUMENTS 62-269704  11/1987  Japan .

Primary Examiner—Frank Sever
Attorney, Agent, or Firm—Birch, Stewart, Kolasch & Birch

[57] ABSTRACT

A surface-hydrophilic, highly selective semipermeable membrane comprising a semipermeable membrane of a hydrophobic polymer and a hydrophilic segment having at least one end directly bonded to at least one surface of the semipermeable membrane is disclosed. The hydrophilic segment comprises at least one methylene group or substituted methylene group which is positioned at least at one end of the segment and at least one neutral hydroxyl group. The surface-hydrophilic, highly selective semipermeable membrane not only has excellent resistance to heat and organic solvents, but also non-adsorptivity for organic substances including even ionic organic substances. Therefore, the surface-hydrophilic, highly selective semipermeable membrane of the present invention can advantageously be used for microfiltration, ultrafiltration, reverse osmosis and dialysis.

8 Claims, 4 Drawing Sheets

SURFACE-HYDROPHILIC, HIGHLY SELECTIVE SEMIPERMEABLE MEMBRANE

BACKGROUND OF THE INVENTION

1. Field of the Invention

The present invention relates to a semipermeable membrane. More particularly, the present invention is concerned with a surface-hydrophilic, highly selective semipermeable membrane which has not only excellent resistance to heat and organic solvents, but also non-adsorptivity for organic substances. The present invention is also concerned with a process for producing the surface-hydrophilic, highly selective semipermeable membrane having non-adsorptivity for organic substances. The semipermeable membrane of the present invention can advantageously be used for microfiltration, ultrafiltration, reverse osmosis and dialysis.

2. Discussion of Related Art

Various attempts were made to produce a semipermeable membrane having excellent heat resistance and a high selectivity.

Recently, an attempt was made to introduce a group having an electric charge to the surface of a semipermeable membrane comprised of a hydrophobic engineering plastic having a heat resistance, thereby rendering the semipermeable membrane hydrophilic. The surface-modified semipermeable membrane is relatively stable in a solution of a temperature as high as 80° to 100 °C with respect to properties, such as separating characteristics and permeability, since the hydrophobic backbone structure of the engineering plastic constitutes a three dimensional skeleton of the semipermeable membrane. Heretofore, to introduce a group having an electric charge to the surface of an engineering plastic, a sulfonation reaction method, in which a sulfonic group is directly introduced to an aromatic ring of the engineering plastic, has mainly been used. A sulfonated engineering plastic can easily be synthesized and, therefore, it is often used as a material for an anionic semipermeable membrane. A representative sulfonated polysulfone is disclosed in, for example, U.S. Pat. No. 3,709,841.

There is also known a surface-sulfonated polysulfone type or surface-sulfonated polyether-imide type semipermeable membrane, which is obtained by treating a polysulfone type or polyether-imide type semipermeable membrane with a sulfonating agent. However, it is noted that since the sulfonation is a reversible reaction (see, R.T. Morrison and R.N. Boyd, "Organic Chemistry", the third edition, volume 1 (1977), p.437-442, published by Tokyo Kagaku Dojin K.K., Japan), desulfonation of a sulfonated polymer disadvantageously occurs when the sulfonated polymer is exposed to an aqueous acid solution at a high temperature. Further, it is presumed that in the case in which a sulfonic group is introduced directly to the aromatic ring of the polymer skeleton of an engineering plastic, the movement of the group having an electric charge (i.e., sulfonic group) is extremely inhibited by the action of the polymer skeleton so that the effective electric charge density becomes low.

Further, it is known that a sulfonated resin having a high sulfonation degree, that is, having a high ion-exchange capacity, is characterized with poor resistance to organic solvents and, therefore, the sulfonated resin is likely to be dissolved in a mixture of acetone and water or a mixture of alcohol and water (see, Japanese Patent Application Publication Specification No. 53-32840). To solve this problem, some studies were made. For example, in Japanese Patent Application Laid-Open Specification No. 62-269704, it is disclosed that a sulfonated polysulfone membrane comprising a polysulfone and a sulfonic group bonded indirectly thereto through a methylene group, which is produced by treating the surface of a polysulfone with propane-sultone in the presence of a Friedel-Crafts catalyst. In this Laid-Open Specification, it is described that the thus treated polysulfone is improved with respect not only to having a resistance to heat and organic solvents, but also to the effective charge density. This is due to an indirect bonding of a sulfonic group to the polysulfone through a joint group (methylene group).

In this connection, however, it is noted that there is another problem with respect to a membrane having an electric charge. The problem is that a group having an electric charge present in the membrane is capable of binding to a counter ion. When ions of organic substances having a high molecular weight, such as a surfactant, are contained as a counter ion in a solution to be contacted with the membrane, the membrane is likely to adsorb organic substances, which causes the fouling of the membrane and the lowering of the flux of the solution. Even in the case of the membrane having a sulfonic group bonded indirectly thereto through a joint group as described in Japanese Patent Application Laid-Open Specification No. 62-269704, the above-mentioned problem remains unsolved.

SUMMARY OF THE INVENTION

The present inventors have made extensive and intensive studies with a view toward solving the above-mentioned problems. As a result, it has unexpectedly been found that when, instead of a conventionally employed group having an electric charge such as sulfonic group, at least one neutral hydroxyl group is bonded indirectly to an aromatic ring of the surface of a semipermeable membrane made of a hydrophobic polymer containing aromatic rings in the main chain thereof, the resultant semipermeable membrane not only has non-adsorptivity for organic substances including even ionic organic substances, but also has excellent resistance to heat and organic solvents. It has also been found that the above-mentioned semipermeable membrane, in which only the surface portion thereof is rendered hydrophilic, is excellent not only in mechanical strength, but also in physical properties, such as separating characteristics and permeability, even when used with a solution at high temperatures, as compared with a conventional membrane which is rendered hydrophilic in its entirety, that is, not only on the surface thereof, but also throughout the thickness of the membrane. This conventional membrane is usually produced by rendering an engineering plastic material hydrophilic and shaping the hydrophilic engineering plastic material into a membrane form. On the basis of these findings, the present invention has been completed.

Accordingly, it is an object of the present invention to provide a surface-hydrophilic, highly selective semipermeable membrane which not only has excellent resistance to heat and organic solvents, but is also non-adsorptivity for organic substances including even ionic organic substances.

It is another object of the present invention to provide a process for producing a surface-hydrophilic, highly selective semipermeable membrane of the above type, which can easily be practiced.

The foregoing and other objects, features and advantages of the present invention will be apparent to those skilled in the art from the following detailed description and appended claims taken in connection with the accompanying drawings.

DETAILED DESCRIPTION OF THE INVENTION

Figure 1:
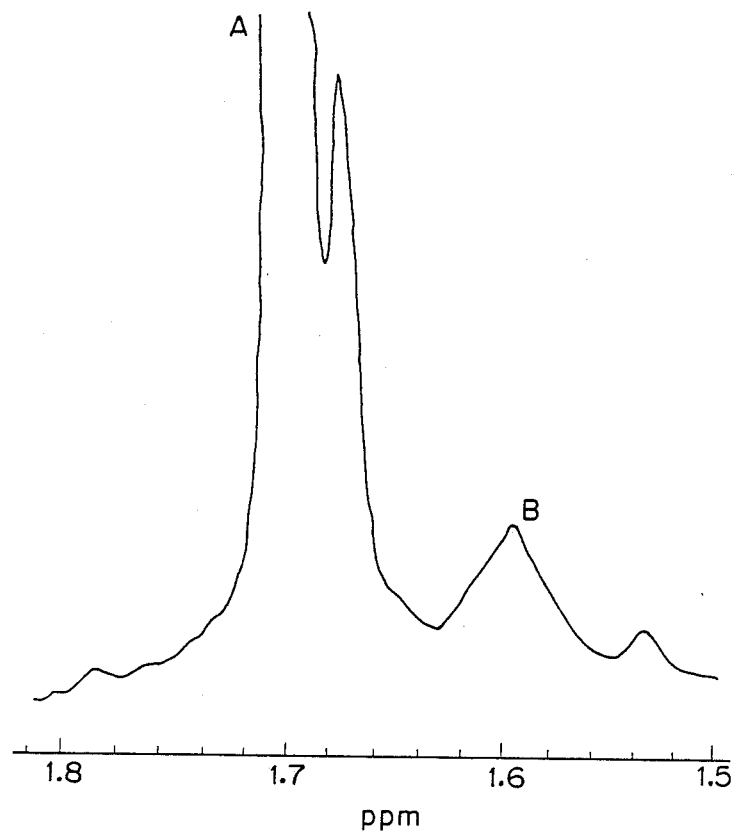
FIG. 1 and FIG. 2 are proton nuclear magnetic resonance (herein after referred to as "NMR") spectra of a semipermeable membrane of the present invention.

Essentially, according to the present invention, there is provided a surface-hydrophilic, highly selective semipermeable membrane comprising:

a semipermeable membrane of a hydrophobic polymer containing aromatic rings in the main chain thereof; and a hydrophilic segment having at least one end directly bonded to the aromatic ring, said hydrophilic segment comprising at least one methylene group or substituted methylene group which is positioned at least at said one end of the segment and at least one neutral hydroxyl group, said methylene group or substituted methylene group being represented by the formula:

wherein each of $R^1$ and $R^2$ independently represents a hydrogen atom, a halogen atom, an alkyl group having 1 to 3 carbon atoms or a halogenated alkyl group having 1 to 3 carbon atoms, and wherein the surface having said hydrophilic segment bonded thereto exhibits a contact angle against water of at least 5° smaller than the contact angle exhibited by the surface of a dense film made of said hydrophobic polymer which does not contain said hydrophilic segment bonded thereto.

The hydrophobic polymer of the semipermeable membrane contains aromatic rings in the main chain thereof. Representative examples of hydrophobic polymers include a polysulfone, a polyether sulfone, a polyimide, a polyether imide, an aromatic polyamide, a polyamide-imide, a polyarylate, an aromatic polyetherether ketone, a polyphenylene sulfide, a polyphenylene oxide, an aromatic polycarbonate and the like. The molecular weight of the hydrophobic polymer is not specifically restricted. A suitable polymer is selected from the above-mentioned polymers in accordance with the shape and use of a semipermeable membrane which is intended to be produced.

The surface-hydrophilic, semipermeable membrane of the present invention may be in any form, that is, may be a flat membrane, a hollow fiber membrane or a tubular membrane. Examples of flat semipermeable membranes are described in, for example, U.S. Pat. No. 3,615,024. Examples of hollow fiber semipermeable membranes are described in, for example, U.S. Pat. No. 4,051,300 and European Pat. No. 0086235.

The surface-hydrophilic, highly selective semipermeable membrane of the present invention comprises a semipermeable membrane and a hydrophilic segment having at least one end directly bonded to the aromatic ring which is present on the surface of the membrane polymer. The hydrophilic segment comprises at least one methylene group or substituted methylene group and at least one neutral hydroxyl group. At least one methylene group or substituted methylene group in the hydrophilic segment is positioned at least at the one end of the segment and therefore directly bonded to the aromatic ring. The term "neutral hydroxyl group" is intended to mean an alcoholic hydroxyl group, exclusive of the hydroxyl group of a carboxyl group and a phenolic hydroxyl group.

The methylene group or substituted methylene group is represented by the following formula:

wherein each of $R^1$ and $R^2$ independently represents a hydrogen atom, a halogen atom, an alkyl group having 1 to 3 carbon atoms or a halogenated alkyl group having 1 to 3 carbon atoms.

In the above-mentioned formula, the type of halogen atom is not specifically restricted. Likewise, the type of halogen atom of the halogenated alkyl group is not specifically restricted. It is preferred that the alkyl group or the alkyl moiety of the halogenated alkyl group has 1 to 3 carbon atoms, because when the member of carbon atoms is 4 or greater, the hydrophilic nature of the hydrophilic segment is deteriorated.

In addition to the methylene group or substituted methylene group and the neutral hydroxyl group, the hydrophilic segment may comprise an ether group and hydroxylmethylene group

In the case where the hydrophilic segment contains an ether group, it is preferred that the molar amount of the ether group in the hydrophilic segment be equal to or be smaller than the molar amount of the methylene group or substituted methylene group. Representative hydrophilic segments comprising a methylene group or substituted methylene group, an ether group and a neutral hydroxyl group are represented by the following formula:

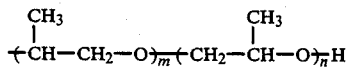

wherein m and n are each an integer of 0 or more with the proviso that m+n ≦ 1.

As will be described later, the hydrophilic segment is formed by treating at least one surface of the above-mentioned semipermeable membrane with an epoxide in the presence of a Friedel-Crafts catalyst. When, for example, propylene oxide is used as an epoxide, the hydrophilic segment bonded to the aromatic ring on the surface of the semi-permeable membrane is represented by, for example, the following formula:

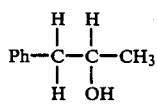

wherein Ph means the aromatic ring in the main chain of the hydrophobic polymer. When ethyleneglycol diglycidyl ether is used as an epoxide, the hydrophilic segment bonded to the aromatic ring on the surface of the semipermeable membrane is represented by, for example, the following formula:

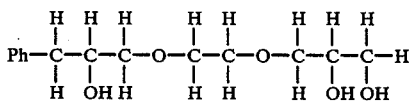

wherein Ph means the aromatic ring in the main chain of the hydrophobic polymer.

In the latter, the hydrophilic segment bonded to the aromatic ring contains an oxygen atom in addition to a methylene group.

Further, when an epoxide having two epoxy rings is used, it is possible that both ends of the hydrophilic segment may be bonded to the aromatic rings of the semipermeable membrane.

The length of the hydrophilic segment is not limited as long as the hydrophilic segment does not block the pores of the membrane and the flux of a feed to be contacted with the semipermeable membrane is not lowered.

The semipermeable membrane has two surfaces, a face surface and a back surface in the case of a flat semipermeable membrane and has an outer surface and an inner surface in the case of a hollow fiber, semipermeable membrane or a tubular, semipermeable membrane. In the present invention, at least one surface of the membrane, which is to be contacted with a feed, is characterized with having the hydrophilic segment bonded thereto so that the surface is rendered hydrophilic. Both surfaces of the membrane may also be rendered hydrophilic. When both surfaces are rendered hydrophilic, the cut-off molecular weight of the membrane may occasionally be somewhat decrease.

In the present invention, the contact angle against water of the surface having a hydrophilic segment bonded thereto is at least 5° smaller than the contact angle exhibited by the surface of a dense film made of a hydrophobic polymer which is the same as the polymer for the semipermeable membrane, but contains no hydrophilic segment bonded thereto. The term "dense film" is intended to define a non-permeable film.

The contact angle of the surface-hydrophilic, highly selective semipermeable membrane against water can be determined according to the so-called drop method in the case of a flat semipermeable membrane or according to the so-called tilting method in the case of a hollow fiber semipermeable membrane or a tubular semipermeable membrane. These methods are described in, for example, "Methods for the determination of a surface tension", edited by Koshiro Sekine, published by Riko Bunko, Japan (1957), pp. 111-112. In the tilting method, an advancing contact angle ($\theta_a$) and a receding contact angle ($\theta_r$) are measured and the contact angle is calculated by the following formula:

$$\text{Contact angle} = \frac{\theta_a + \theta_r}{2}.$$

The shape of the dense film to be used is preferably the same as or similar to the shape of the semipermeable membrane. For example, when the semipermeable membrane is a flat membrane, a flat dense film is preferably used. When the semipermeable membrane is a hollow fiber semipermeable membrane or a tubular semipermeable membrane, a flat dense film is used and the contact angle of the dense film is measured after the dense film has been bent to have a curvature which is almost the same as that of the hollow fiber or tubular, semipermeable membrane.

As mentioned above, the surface-hydrophilic, highly selective semipermeable membrane of the present invention may be in any form, that is, it may be a flat membrane, a hollow fiber membrane or a tubular membrane. Of these, a hollow fiber membrane is preferred from the standpoint of the efficiency of filtration. Most preferred is a hollow fiber membrane having an inner diameter of from 100 μm to 3 mm and a membrane thickness of from 25 μm to 1 mm.

The cut-off molecular weight of the semipermeable membrane of the present invention is not limited and may be varied according to the use of the semipermeable membrane.

The surface-hydrophilic, highly selective semipermeable membrane of the present invention has a specific membrane surface structure in which a hydrophilic segment having at least one end directly bonded to an aromatic ring which is present on the surface of the membrane polymer, wherein the hydrophilic segment comprises at least one methylene group or substituted methylene group which is positioned at least at one end of the segment and therefore directly bonded to an aromatic ring on the membrane polymer, and at least one neutral hydroxyl group. With this specific membrane surface structure, the semipermeable membrane of the present invention is capable of preventing organic substances including even ionic organic substances from being adsorbed on the surface of the membrane. As a result, the semipermeable membrane exerts high permeation-separation performances without the fouling of the membrane occurring.

In another aspect of the present invention, there is provided a process for producing the surface-hydrophilic, highly selective semipermeable membrane, which comprises treating, at least one surface of a semipermeable membrane of a hydrophobic polymer containing aromatic rings in the main chain thereof with an epoxide in the presence of a Friedel-Crafts catalyst.

As the semipermeable membrane to be treated with an epoxide, there may be used those as mentioned above with respect to the surface-hydrophilic, highly selective semipermeable membrane of the present invention. Examples of hydrophobic polymers include a polysulfone, a polyether sulfone, a polyimide, a polyether imide, an aromatic polyamide, a polyamide-imide, a polyarylate, an aromatic, a polyether-ether ketone, a polyphenylene sulfide, a polyphenylene oxide, a polycarbonate and the like. The semipermeable membrane used in the method of the present invention may be prepared according to the method as described in, for example, European Pat. No. 0086235, U.S. Pat. No. 3,615,024, U.S. Pat. No. 4,051,300, and the like. The semipermeable to be used in the method of the present invention may be in any form, that is, in the form of a flat membrane, a hollow fiber membrane or a tubular membrane, and the shape of the membrane may suitably be selected according to the use of the final surface-hydrophilic, highly selective semipermeable membrane.

Before the treatment of the semipermeable membrane with an epoxide, the semipermeable membrane is sufficiently washed with water and then dried. In drying the washed membrane, for preventing the destruction of the structure of the membrane during the drying, it is preferred that the membrane be sufficiently immersed in a glycerin solution after washing the membrane and, dried in vaccuo.

The epoxide to be used for treating at least one surface of the semipermeable membrane, is defined as a compound containing at least one epoxy ring, that is, at least one three-membered ring consisting of two carbon atoms bonded to each other and one oxygen atom bonded to each of the two carbon atoms. Representative examples of the epoxides to be used in the method of the present invention include ethylene oxide, propylene oxide, trimethylene oxide, ethylene glycol diglycidyl ether, diethylene glycol diglycidyl ether, polyethylene glycol diglycidyl ether, propylene glycol diglycidyl ether, glycerin polyglycidyl ether, trimethylolpropane polyglycidyl ether, neopentyl glycol diglycidyl ether, and the like.

Examples of Friedel-Crafts catalysts to be used in the method of the present invention include Lewis acids, such as $AlCl_3$, $ZnO$, $ZnCl_2$, $FeCl_3$, $SnCl_2$ and $SnCl_4$, and other electron acceptors, such as $HF$, $BF_3$ and $H^+$.

The Friedel-Crafts catalyst may be used in an amount of from 0.01 to 50 % by mole, preferably from 0.1 to 5 % by mole, based on the amount of the epoxide. The treatment of the membrane with an epoxide in the presence of an excess amount of the catalyst for a relatively long time, for example, for one hour or more, is disadvantageous in that the breakage of the primary structure of the membrane is likely to occur.

In practicing the treatment of the surface of a semipermeable membrane with an epoxide in the presence of a Friedel-Crafts catalyst, in order to increase the fluidity of the mixture of an epoxide and a catalyst and to provide stable reaction conditions, a solution of the mixture in an appropriate solvent is preferably used for the reaction. The type of solvent is not specifically limited as long as the membrane does not dissolve in the solvent. Examples of solvents include paraffinic hydrocarbons such as n-hexane. The amount of the solvent is not limited, and may be varied suitably depending upon the solubility of the epoxide used.

It is preferred that the treatment of a semi-permeable membrane be conducted at a temperature of 15° C or lower but higher than the melting point of the epoxide. The temperature must also be higher than the melting point of the solvent when a solvent is used. The treatment with an epoxide at a temperature higher than 15° C is not preferable because an undesirable polymerization reaction of the epoxide preferentially occurs.

When only one surface of a semipermeable membrane is intended to be treated, the contact of the membrane with a mixture of an epoxide and catalyst may be conducted as follows. When the semipermeable membrane is a flat membrane, the membrane may be contacted with a mixture of an epoxide and a catalyst by coating one surface of the membrane with the mixture, or by floating the membrane on the mixture in a manner such that only one surface of the membrane contacts the mixture. When the semipermeable membrane is a hollow fiber membrane and it is intended to treat only the outer surface of the hollow fiber membrane, the contact of the outer surface with a mixture of an epoxide and a catalyst may be conducted simply by immersing the hollow fiber membrane in the mixture. In order to ensure prevention of the mixture from penetrating into the hollow portion of the membrane, the end portions of the hollow fiber membrane may generally be closed by, for example, an adhesive during the immersion. On the other hand, when only the inner surface of a hollow fiber semipermeable membrane is intended to be treated with an epoxide, the contact of the inner surface with a mixture of an epoxide and a catalyst may be conducted by immersing one end portion of the hollow fiber membrane in the mixture and introducing the mixture into the hollow portion of the hollow fiber membrane using, for example, a syringe. When the semipermeable membrane is a tubular membrane and it is intended to treat only the outer surface of the membrane, the contact of the outer surface of the membrane with the mixture may be conducted by closing both end portions of the tubular membrane and immersing the membrane in the mixture. On the other hand, when only the inner surface of the tubular membrane is intended to be treated with an epoxide, the contact of the inner surface of the tubular membrane with the mixture may be conducted by introducing the mixture into the inside of the tubular membrane.

On the other hand, when both surfaces of a semipermeable membrane are intended to be treated with an epoxide, the semipermeable membrane is entirely immersed in a mixture of an epoxide and a catalyst so that both surfaces are contacted with the mixture.

The treatment of the semipermeable membrane with an epoxide in the presence of a Friedel-Crafts catalyst is conducted until the hydrophilic segment comprising at least one neutral hydroxyl group and at least one methylene group or substituted methylene group is bonded to the aromatic ring on at least one surface of the semipermeable membrane, so that the surface having the hydrophilic segment bonded thereto exhibits a contact angle against water of at least 5° smaller than the contact angle exhibited by the surface of a dense film made of the hydrophobic polymer which does not contain the hydrophilic segment bonded thereto. The time for treating the membrane with an epoxide to attain the above-mentioned contact angle depends upon the types of the semipermeable membrane and epoxide. However, the treatment is generally conducted for about 30 seconds to about 1 hour.

By the above-mentioned treatment, one molecule of epoxide is bonded to the aromatic ring on the surface of the semipermeable membrane to form a peculiar hydrophilic segment. Alternatively, two or more molecules of epoxide can be bonded, for example, in the form of a polymer, to the aromatic ring on the surface of the semipermeable membrane. In fact, it is considered that various lengths of hydrophilic segments are bonded to the surface of the semipermeable membrane.

Thus, there is obtained a specific membrane surface structure in which a hydrophilic segment having at least one end directly bonded to the aromatic ring which is present on the surface of the membrane polymer, wherein the hydrophilic segment comprises at least one methylene group or substituted methylene group which is positioned at least at the one end of the segment and therefore directly bonded to the aromatic ring on the membrane polymer, and at least one neutral hydroxyl group. With this specific membrane surface structure, the semipermeable membrane of the present invention is capable of preventing organic substances including even ionic organic substances from being adsorbed on the surface of the membrane. As a result, the semipermeable membrane exerts high permeation-separation performances without the fouling of the membrane occurring.

Whether or not the treated surface of the obtained semipermeable membrane is hydrophilic, can be determined, for example, by measuring the contact angle against water according to the methods as mentioned above, or by examining the presence or absence of a hydroxyl group on the treated surface of the membrane according to the FT-IR spectrophotometry (ATR method) as described in, for example, "Fundamentals and applications of Polymer surfaces", Volume 1, pp. 95–119, 1986, published by Tokyo Kagaku Dojin K.K., Japan). Further, whether or not a methylene group is present in the hydrophilic segment bonded to the surface of the semipermeable membrane may be determined by FT-IR spectrometry and NMR spectrometry as described in, for example, "Method for Identification of Organic Compounds by Spectrometry", 3rd edition, (1986), published by Tokyo Kagaku Dojin K.K., Japan, pp. 68–210.

The surface-hydrophilic, highly selective semipermeable membrane of the present invention has excellent non-adsorptivity for organic substances in addition to having excellent heat resistance, resistance to organic solvents and mechanical strengths. Therefore, the surface-hydrophilic, highly selective semipermeable membrane of the present invention can advantageously be used for microfiltration, ultrafiltration, reverse osmosis, dialysis, and the like with high selectivity without suffering from a fouling of the membrane due to the adsorption of organic substances on the surface of the membrane.

DETAILED DESCRIPTION OF THE PREFERRED EMBODIMENTS

This invention will now be described in detail with reference to the following Examples and Comparative Examples, but they should not be construed as limiting the scope of the present invention. In the Examples and Comparative Examples, all chemicals used are of the guaranteed reagent grade. The measurement of contact angle against water is conducted using a contact angle gauge CA-A (manufactured and sold by Kyowa Kaimen Kagaku Kabushiki Kaisha, Japan). Further, the water permeability and the rejection of solutes of the semipermeable membrane are determined by the following methods.

(1) Determination of water permeability

Before determining the water permeability, the semipermeable membrane is immersed in ethanol for 30 min to degas the membrane, and the membrane is then immersed in distilled water for 30 min to remove the ethanol from the membrane.

With respect to a flat membrane, the water permeability is determined as follows. A flat membrane is set in a flat membrane testing apparatus (manufactured and sold by Bioengineering Co., Ltd., Japan) and, using the apparatus, the filtration test of the membrane for distilled water of 25° C is conducted under a pressure of 1.0 kg/cm$^2$ The water permeability is expressed in terms of the volume of water having passed through the membrane per unit area of the membrane (cm$^2$) per minute.

On the other hand, with respect to a hollow fiber membrane, the water permeability is determined as follows. A hollow fiber membrane is cut to the length of 30 cm. The hollow portion of the cut hollow fiber membrane is filled with distilled water of 25° C using a syringe to remove the air in the hollow portion. Then, one end of the hollow fiber membrane is sealed, and distilled water of 25° C is introduced from the other end of the hollow fiber membrane in the hollow portion thereof under a pressure of 1.0 kg/cm$^2$ to conduct filtration of distilled water. The water permeability is expressed in terms of the volume of water having passed through the membrane per unit length of the membrane (m) per minute.

(2) Determination of rejection of solutes (separation characteristics)

Filtration is conducted in substantially the same manner as mentioned above with respect to the measurement of water permeability, except that an aqueous dextran solution or an aqueous polyethylene glycol solution having a predetermined dextran or polyethylene glycol concentration is used instead of distilled water. Then, the dextran or polyethylene glycol concentration of the obtained filtrate is measured by means of a digital refractometer DBX-50 (manufactured and sold by Atago K.K., Japan). From the concentration of a solute (dextran or polyethylene glycol) in the original solution and the concentration of the solute in the filtrate, the rejection (%) of solute by the membrane is calculated by the following formula:

$$\text{Rejection (\%)} = \left(1 - \frac{B}{A}\right) \times 100$$

wherein A is the solute concentration of the original solution and B is the solute concentration of the filtrate.

Example 1

(Preparation of a membrane)

15 parts by weight of polysulfone P-3500 (manufactured and sold by Union Carbide Co., Ltd., U.S.A.) are added to 75 parts by weight of dimethylacetamide and heated for 4 hours to dissolve the polysulfone in the dimethylacetamide. Then, to the resultant solution are added 10 parts by weight of tetraethylene glycol. The thus obtained polymer solution is subjected to degassing and then cooled to room temperature. The cooled polymer solution is subjected to film-casting on a glass plate and immediately immersed in water and kept at 20° C for one day. Thus, there is obtained a flat semipermeable membrane having a thickness of 0.1 mm. The filtration of water through the membrane is conducted to determine the water permeability of the membrane. As a result, the water permeability of the flat semipermeable membrane is found to be 7.8 ml/min. cm$^2$. (kg/cm$^2$) at 25° C. Further, using a dextran solution containing 5 % by weight of dextran having a molecular weight of 1×10$^4$, the rejection of dextran by the membrane is determined. As a result, the rejection of dextran having a molecular weight of 1×10$^4$ by the flat semipermeable membrane is found to be 8.0 %. Then, the flat semipermeable membrane is immersed in an aqueous glycerin solution containing 25 % by weight of glycerin at 60° C for 5 hours. Then, the flat semipermeable membrane is taken out from the solution and dried for 24 hours in a dryer, to thereby obtain a dried polysulfone flat semipermeable membrane. The thus obtained dried semipermeable membrane is immersed in ethanol. The water permeability and the rejection of dextran of the flat semipermeable membrane are determined in the same manner as mentioned above. As a result, it is found that the water permeability and the rejection of dextran are almost the same as those determined before treating the membrane with a glycerin solution.

On the other hand, 2.32 g of propylene oxide is added to 106 g of n-hexane which has been cooled at 5° C. To the resultant solution is added 6.4 g of anhydrous aluminum chloride, to thereby obtain a mixture for treating the surface of a semipermeable membrane.

The thus obtained mixture is maintained at 5° C. The dried polysulfone flat semipermeable membrane obtained above is immersed in the mixture for 30 min. The resultant membrane is then washed with water sufficiently and further washed with ethanol for 10 min. The resultant surface-treated flat semipermeable membrane is stored in water. The water permeability and the rejection of dextran are determined with respect to the thus obtained surface-treated flat semipermeable membrane. The water permeability is found to be 2.1 ml/min·cm$^2$·(kg/cm$^2$) at 25° C. That is, the water permeability has been lowered to about 27 % of the water permeability of the semipermeable membrane before the surface treatment. However, the rejection of dextran has been increased to 63 %. This indicates that the separation characteristics of the flat semipermeable membrane are improved by the surface treatment.

The above-obtained flat semipermeable membrane is air-dried for two days and subjected to measurement of the contact angle against water by the drop method as mentioned before. The contact angle against water of the surface of the surface-treated flat semipermeable membrane is found to be 60°. On the other hand, a dense film is prepared by dissolving the same polysulfone as used above in dichloromethane at a concentration of 1 % by weight, charging the resultant solution in a Petri dish, heating the solution at 50° C for 10 minutes and drying the thus formed film in vaccuo. The contact angle against water of the surface of the dense film is measured in the same manner as mentioned above. As a result, it is found that the contact angle against water of the surface of the dense film is 75°. From the foregoing, it is apparent that the surface of the surface-treated flat semipermeable membrane exhibits a contact angle against water of 15° smaller than the contact angle exhibited by the surface of the dense film.

(Adsorptivity for organic substances)

In order to compare the adsorptivities for organic substances of the surface-treated and non-treated semipermeable membranes, with respect to the surface-treated, flat semipermeable membrane and the flat semipermeable membrane before the surface treatment, which are obtained above, the water permeability (Jo) of distilled water and the water permeability (J) of a 5,000 ppm aqueous solution of polyethylene glycol #6,000 (hereinafter referred to as "PG solution") are measured, and Jη/Joηo is calculated (η: viscosity of PG solution, ηo: viscosity of distilled water). The results are shown in Table 1.

TABLE 1

|  | semipermeable membrane not surface-treated | surface-treated, semipermeable membrane |
|---|---|---|
| J | 1.8 | 1.1 |
| Jo | 7.8 | 2.1 |
| Jη/Joηo | 0.26 | 0.58 |

J, Jo: ml/m · cm$^2$ · (kg/cm$^2$) at 25° C.

Assuming that the water permeability is represented by the Hagen-Poiseuille equation (equation I) and that the decrease of the water permeability when distilled water is changed to PG solution is due to the decrease of pore diameter (r) of the membrane caused by the adsorption of a solute (i.e., polyethylene glycol) on the surface of the pores at the skin portion of the membrane, the Jη/Joηo can be represented by equation II. As apparent from the equation II, the smaller the decrease in pore diameter by the adsorption of a solute, the larger the value of Jη/Joηo becomes so that the value approaches 1.

As apparent from the results shown in Table 1, the non-adsorptivity for organic substances of the surface-treated membrane is markedly improved as compared to that of the membrane not surface-treated. Therefore, the Jη/Joηo can be used as a parameter of the adsorptivity for a solute.

Equation I $J = n\Delta r^4 \Delta P / 8\eta d$

J : flow rate n : number of pores running through the membrane per unit area r : pore diameter ΔP : difference in pressure η: viscosity d : length of a pore running through a membrane (membrane thickness × index representing the degree of curving of the running pore)

Equation II $J\eta/Jo\eta o = r_s^4/r_o^4$ $r_s$ pore diameter when a solution is flowed (pore diameter reduced to the solute adsorption)

$r_o$ pore diameter when distilled water is flowed (pore diameter maintained unchanged because of non-adsorption of solute)

(Adsorptivity for ionic organic substances)

The obtained surface-treated flat semipermeable membrane is contacted with brilliant green (cationic dye) As a result, it is found that both the surfaces of the surface-treated semipermeable membrane are not dyed with brilliant green. This shows that the surface-treated semipermeable membrane of the present invention exhibits non-adsorptivity for ionic organic substances.

(Resistance to heat and organic solvents)

In order to examine the resistance to heat and organic substances of the surface-treated semipermeable membrane, the immersion test is conducted as follows.

Two surface-treated flat semipermeable membranes are produced in the same manner as mentioned above, and subjected to immersion testing under the following two conditions:

(1) immersion in hot water of 97° C for 24 hours, and
(2) immersion in the mixture of water and isopropyl alcohol in a weight ratio of 1:1 at 80° C for one week.

The resultant surface-treated flat semipermeable membranes are subjected to measurement of a contact angle against water, water permeability and rejection of dextran in the same manner as mentioned above. As a result, it is found that the contact angle against water of the surface of the surface-treated flat semipermeable membrane, water permeability of the membrane and rejection of dextran by the membrane are not changed by the immersion under both the conditions mentioned above.

From the results, it is apparent that the surface-treated semipermeable membrane of the present invention is excellent in resistance to heat and organic solvents.

(Identification of a hydrophilic segment by $^1$H-NMR analysis)

The surface-treated flat semipermeable membrane is washed sufficiently with water and the surface portion of the semipermeable membrane is cut off and dissolved in deuterium-containing chloroform. The resultant solution is subjected to proton-NMR analysis at 400 MHz using an NMR analyzer JNM-GFX 400 (manufactured and sold by JEOL LTD., Japan). As a result, it is found that the peak of the proton of a methyl group ascribed to the bisphenol A residue of the polysulfone is observed around 1.7 ppm at 25.0° C (see, peak A in FIG. 1). On the other hand, an additional peak is observed at 1.6 ppm at 45.3° C (see, peak B in FIG. 1). That is, by increasing the temperature, a peak masked by the peak of the methyl group is shifted to the side of higher magnetic field to form peak B. From this fact, it is considered that peak B in FIG. 1 is of the proton of a hydroxyl group present in the hydrophilic segment bonded to the surface of the semipermeable membrane. However, with respect to the semipermeable membrane before the surface treatment, any peak is not observed at 1.6 ppm at 45.3° C.

Figure 2:
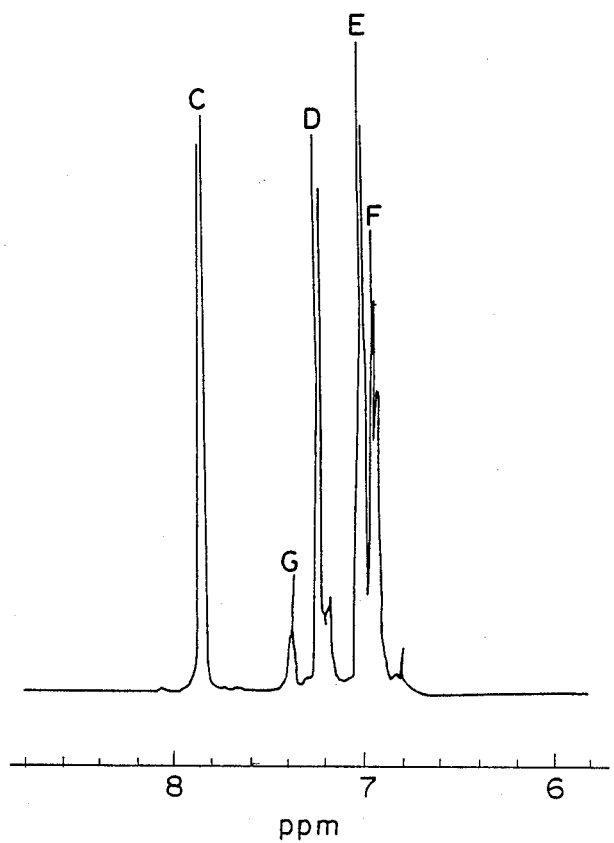

With respect to the peak at about 6.5 to about 8.5 ppm ascribed to an aromatic ring, the surface treated semipermeable membrane exhibits small peaks including peak G, in addition to peaks C, D, E and F which are observed with respect to the polysulfone before the surface treatment (see FIG. 2).

From the above-mentioned results, it is considered that the hydrophilic segment is bonded to the aromatic ring of the aromatic ring-containing unit of the polysulfone.

Comparative Example 1

According to the method described in Example 1 of Japanese Patent Application Laid-Open Specification No. 62-269704, a dried flat polysulfone membrane is immersed in a mixture of 60 g of propanesultone and 5 g of anhydrous aluminum chloride at 80° C for 20 min, and washed with water and further washed with ethanol, to thereby obtain a surface-sulfonated polysulfone membrane.

The thus obtained surface-sulfonated membrane is examined with respect to the adsorptivity for ionic organic substances in substantially the same manner as in Example 1. As a result, it is found that the surface of the surface-sulfonated membrane is dyed with brilliant green (cationic dye), and assumes blue-green color.

Example 2

Substantially the same procedure as in Example 1 is repeated except that 20 parts by weight of polysulfone P-3500 (manufactured and sold by Union Carbide Co., Ltd., U.S.A.), 71 parts by weight of dimethylacetamide and 9 parts by weight of tetraethylene glycol are used, to thereby obtain a polymer solution. Using the above-obtained polymer solution, a hollow fiber semipermeable membrane having an outer diameter of 1.35 mm and an inner diameter of 0.75 mm is prepared according to the method as described in Example 1 of European Patent 0086235. The water permeability of the obtained membrane and the rejection of dextran by the membrane are measured in the same manner as in Example 1. As a result, the water permeability and the rejection of dextran are found to be 9.9 ml/m.min. (kg/cm$^2$) at 25° C and 18.8 %, respectively. The membrane is cut to the length of 50 cm. Then, the membrane is immersed in an aqueous glycerin solution and dried in substantially the same manner as in Example 1, to thereby obtain a dried polysulfone, hollow fiber membrane. The thus obtained dried membrane is immersed in ethanol and subjected to measurement of water permeability and rejection of dextran in the same manner as in Example 1. As a result, it is found that the water permeability of and the rejection of dextran by the thus obtained dried membrane are not changed by drying.

One end portion of the above-obtained dried hollow fiber membrane is immersed, at a length of 1 cm, in a mixture for surface treatment cooled at 5° C, which is obtained as in Example 1. The other end of the membrane is connected to a disposable syringe having a volume of 5 ml and the mixture is introduced into the hollow portion of the membrane by suction. The membrane is allowed to stand for 10 min to conduct surface treatment of the inner surface of the membrane, and immediately washed with water. Then, the washed membrane is immersed in ethanol for 10 min and stored in water. The thus obtained membrane is found to have a water permeability of 1.9 ml/m·min·(kg/cm$^2$) at 25° C. The water permeability of the inner surface-treated, hollow fiber membrane is lowered to about 20% of that of the hollow fiber membrane before surface treatment. However, the rejection of dextran by the inner surface-treated, hollow fiber membrane is 63%, and, therefore, the separation characteristics of the hollow fiber membrane are improved by the surface treatment. Further, the rejections of a 5,000 ppm aqueous solution of polyethylene glycol 6000 by the hollow fiber membranes before and after the surface treatment are measured in substantially the same manner as in Example 1. As a result, it is found that the hollow fiber membrane, prior to the surface treatment, has a rejection of zero, whereas the surface-treated, hollow fiber membrane has a rejection of 47%. From these results, it is apparent that the separation characteristics of the hollow fiber membrane are markedly improved by the surface treatment.

Then, in order to compare the adsorptivities for organic substances of the surface-treated and non-treated semipermeable membranes, the $J\eta/Jo\eta o$ value is determined, with respect to each of the surface-treated, hollow fiber semipermeable membrane and the semipermeable membrane before the surface treatment, in substantially the same manner as in Example 1. The results are shown in Table 2.

As is apparent from the results, the surface-treated semipermeable membrane of the present invention exhibits low adsorptivity for organic substance (i.e., polyethylene glycol) as compared to the semipermeable membrane which is not surface-treated.

Further, in order to examine the resistance to heat and organic substances of the surface-treated semipermeable membrane, the immersion test is conducted in substantially the same manner as in Example 1. As a result, it is found that the contact angle against water of the surface of the surface-treated semipermeable membrane, water permeability of the membrane and rejection of dextran by the membrane are not changed after the immersion testing under the two different conditions mentioned in Example 1.

From the results, it is apparent that the surface-treated semipermeable membrane of the present invention is excellent in resistance to heat and organic solvents.

Figure 4:
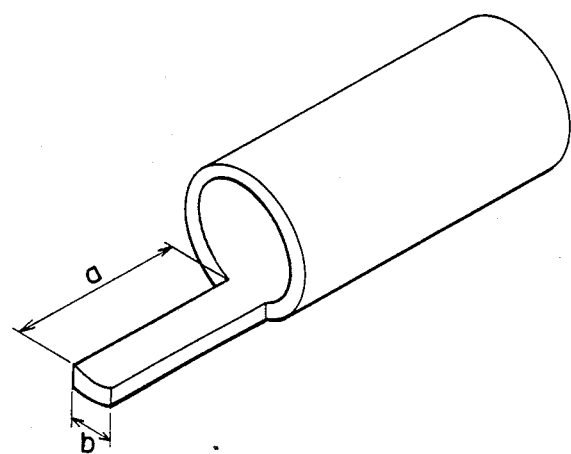
FIG. 4 is a diagrammatic perspective view of a test sample prepared from the hollow fiber semipermeable membrane obtained in Example 2 for determining the contact angle of the inner surface thereof against water.

After drying, the surface-treated hollow fiber membrane is cut to form a test sample having a shape as shown in FIG. 4. In FIG. 4, the width "a" is about 0.5 mm and the length "b" is about 2 cm. The contact angle against water of the inner portion of the above-obtained test sample is measured by the tilting method as mentioned before. The contact angle against water of the inner surface of the membrane is 45°. On the other hand, a dense film which is separately made of a polysulfone in the same manner as in Example 1, is bent to have a curvature similar to that of the hollow fiber membrane and the contact angle against water of the portion of the bent dense film corresponding to the inner surface of the hollow fiber membrane is measures by the tilting method as mentioned above. The contact angle against water of the dense film is 55°.

Figure 3:
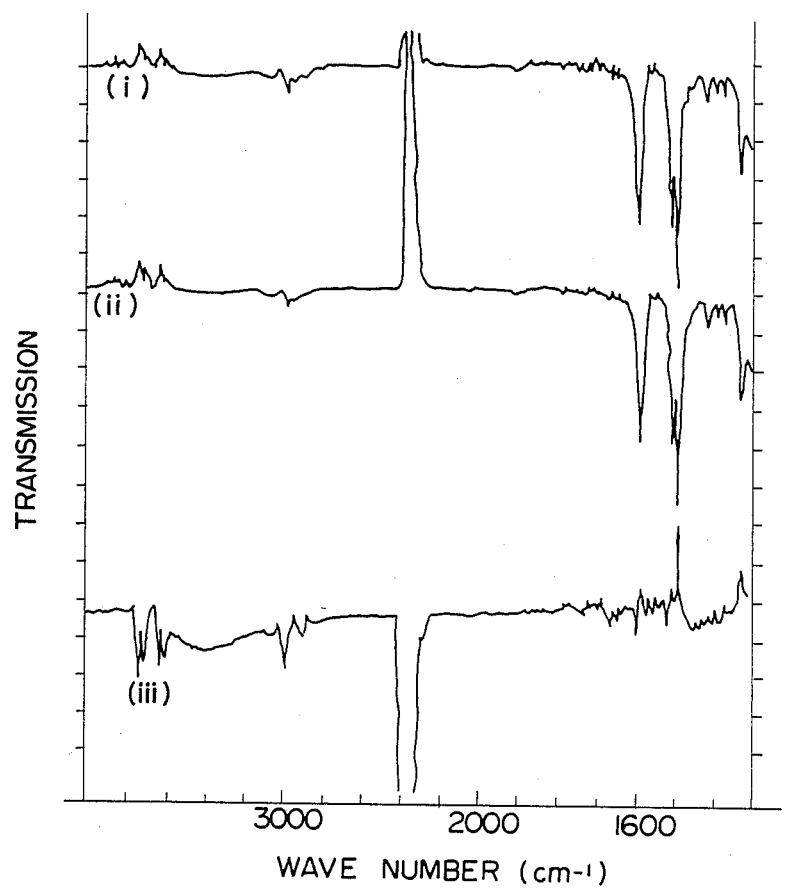
FIG. 3 is Fourier transform-infrared (hereinafter referred to as "FT-IR") spectra of (i) : the inner surface of the hollow fiber semipermeable membrane of the present invention obtained in Example 2, which inner surface has been treated according to the present invention, (ii) : the inner surface of a hollow fiber semipermeable membrane, which has been obtained by the same procedure as in Example 2, except that the surface treatment has been omitted, and (iii) : the difference between (A) and (B)

The hollow fiber membrane is sufficiently washed with water and then dried, and the inner surface portion of the hollow fiber membrane is subjected to FT-IR spectrometry (ATR method) and the difference spectrum between the surface-treated, hollow fiber membrane and the hollow fiber membrane before the surface treatment is obtained. The results are shown in FIG. 3. As shown in FIG. 3, the peak at around 3400 cm$^{-1}$ ascribed to the hydroxyl group and the peaks at about 2,800 to about 3,000 cm$^{-1}$ ascribed to the alkyl group of the propylene oxide residue are observed. From the results, it is confirmed that a propylene oxide is bonded to the inner surface of the surface-treated, hollow fiber membrane. Further, by the FT-IR spectrometry (ATR method), the outer surface of the inner surface-treated, hollow fiber membrane is found to exhibit the same spectrum as that for the hollow fiber membrane before the surface treatment. From these results, it is confirmed that no hydrophilic segment is bonded to the outer surface of the inner surface-treated, hollow fiber membrane.

Example 3

The dried polysulfone, hollow fiber membrane obtained in Example 2 is cut to the length of 30 cm. Then, a disposable syringe having a volume of 10 ml is connected to one end of the cut hollow fiber membrane and the entirety of the hollow fiber membrane is immersed in the mixture for surface treatment as used in Example 1, which has been kept at 5° C. Immediately upon immersing the membrane in the mixture, the mixture is introduced in the hollow portion of the hollow fiber membrane by sucking using the disposable syringe and allowed to stand for 10 min. Then, the resultant hollow fiber membrane is washed with water and further washed in ethanol for 10 min. The thus obtained surface-treated, hollow fiber membrane is stored in water. The water permeability of the thus obtained surface-treated, hollow fiber membrane and the rejection of dextran by the membrane are, respectively, 1.7 ml/m·min·(kg/cm$^2$) at 25° C, and 92% as measured using a solution containing 5% by weight of dextran having a molecular weight of $1\times10^4$. The outer surface and the inner surface of the surface-treated, hollow fiber membrane are subjected to FT-IR spectrometry (ATR method). From the results, it is confirmed that a hydrophilic segment is bonded to both the inner surface and the outer surface of the hollow fiber membrane.

The above-obtained surface-treated, hollow fiber membrane is dried in the same manner as in Example 1 and the contact angles against water of the inner surface and the outer surface of the surface-treated, hollow fiber membrane are measured in substantially the same manner as in Example 2. The contact angles against water of the inner surface and the outer surface of the surface-treated, hollow fiber membrane are 47° and 43°, respectively. On the other hand, the contact angles against water of the inner surface and the outer surface of the cylindrical dense film made of the same polysulfone as used in Example 2 are measured. The contact angles against water of the inner surface and the outer surface of the cylindrical dense film are 55° and 50°, respectively.

Then, in order to compare the adsorptivities for organic substances of the surface-treated and non-treated semipermeable membranes, the $J\eta/Jo\eta o$ value is determined, with respect to each of the surface-treated, hollow fiber semipermeable membrane and the semipermeable membrane before the surface treatment, in substantially the same manner as in Example 1. The results are shown in Table 2.

As is apparent from the results, the surface-treated, semipermeable membrane of the present invention exhibits low adsorptivity for organic substance (i.e., polyethylene glycol) as compared to the semipermeable membrane which is not surface-treated.

Further, in order to examine the resistance to heat and organic substances of the surface-treated semipermeable membrane, the immersion testing is conducted in substantially the same manner as in Example 1. As a result, it is found that the contact angle against water of the surface of the surface-treated semipermeable membrane, water permeability of the membrane and rejection of dextran by the membrane are not changed after the immersion testing under the two different conditions mentioned in Example 1.

From the results, it is apparent that the surface-treated, semipermeable membrane of the present invention is excellent in resistance to heat and organic solvents.

Example 4

Substantially the same procedure as in Example 2 is repeated except that the time for the surface treatment is changed to 35 min, to thereby obtain an inner surface-treated, hollow fiber membrane. The water permeability of the obtained inner surface-treated, hollow fiber membrane is 4.1 ml/m·min. (kg/cm$^2$) at 25° C. The rejection of polyethylene glycol #6000 by the membrane as measured in the same manner as in Example 2 is 32%. Further, the inner surface-treated, hollow fiber membrane is subjected to FT-IR spectrometry (ATR method). From the results, it is confirmed that a hydrophilic segment is bonded to the inner surface of the hollow fiber, semipermeable membrane.

According to the method described in Example 2, the contact angle against water of the inner surface of the inner surface-treated, hollow fiber membranes is measured. As a result, it is found that the inner surface of the surface-treated, hollow fiber semipermeable membrane obtained in Example 4 exhibits a contact angle against water of 45°. On the other hand, the surface of polysulfone dense film obtained in Example 2 exhibits a contact angle against water of 55°.

Then, in order to compare the adsorptivities for organic substances of the surface-treated and non-treated semipermeable membranes, the $J\eta/Jo\eta0$ value is determined, with respect to each of the surface-treated, hollow fiber semipermeable membrane and the semipermeable membrane before the surface treatment, in substantially the same manner as in Example 1. The results are shown in Table 2.

As is apparent from the results, the surface-treated, semipermeable membrane of the present invention exhibits low adsorptivity for organic substance (i.e., polyethylene glycol) as compared to the semipermeable membrane which is not surface-treated.

Further, in order to examine the resistance to heat and organic substances of the surface-treated semipermeable membrane, the immersion testing is conducted in substantially the same manner as in Example 1. As a result, it is found that the contact angle against water of the surface of the surface-treated semipermeable membrane, water permeability of the membrane and rejection of dextran by the membrane are not changed after the immersion testing under the two different conditions mentioned in Example 1.

From the results, it is apparent that the surface-treated, semipermeable membrane of the present invention is excellent in resistance to heat and organic solvents.

Example 5

4.5 g of stannic chloride is added to 20 g of n-hexane which has been cooled at a temperature of 5° C and the resultant solution is maintained at a temperature of 5° C. The obtained solution is hereinafter referred to as "solution A". On the other hand, 5 g of propylene oxide is added into 20 g of n-hexane which has been cooled at a temperature of 5° C and the resultant solution is maintained at 5° C. The obtained solution is hereinafter referred to as "solution B".

In substantially the same manner as in Example 2, solution A is introduced into the hollow portion of a dried polysulfone, hollow fiber semipermeable membrane and the resultant membrane is allowed to stand for 10 seconds. Then, the solution A in the hollow fiber, semipermeable membrane is pushed out and, then, the solution B is introduced into the hollow portion of the hollow fiber, semipermeable membrane. The resultant membrane is allowed to stand for 10 seconds.

The obtained semipermeable membrane is washed with water sufficiently and further washed with ethanol for 10 min. The washed semipermeable membrane is stored in water. The water permeability of the thus obtained semipermeable membrane is 5.5 ml/m·min·(kg/cm²) at 25° C. The rejection of polyethylene glycol #6000 by the membrane is 6%.

Then, the inner surface-treated, hollow fiber semipermeable membrane is subjected to FT-IR spectrometry (ATR) method. From the results, it is confirmed that a hydrophilic segment is bonded to the inner surface of the surface-treated, hollow fiber semipermeable membrane.

In substantially the same manner as in Example 2, the contact angle against water of the inner surface of the surface-treated, hollow fiber semipermeable membrane is measured. From the results, it is found that the contact angle against water of the inner surface of the surface-treated membrane is 48°. On the other hand, the surface of the polysulfone dense film obtained in Example 2 exhibits a contact angle against water is 55°.

Then, in order to compare the adsorptivities for organic substances of the surface-treated and non-treated semipermeable membranes, the $J\eta/Jo\eta o$ value is determined, with respect to each of the surface-treated, hollow fiber semipermeable membrane and the semipermeable membrane before the surface treatment, in substantially the same manner as in Example 1. The results are shown in Table 2.

As is apparent from the results, the surface-treated, semipermeable membrane of the present invention exhibits low adsorptivity for organic substances (i.e., polyethylene glycol) as compared to the semipermeable membrane which is not surface-treated.

Further, in order to examine the resistance to heat and organic substances of the surface-treated semipermeable membrane, the immersion testing is conducted in substantially the same manner as in Example 1. As a result, it is found that the contact angle against water of the surface of the surface-treated semipermeable membrane, water permeability of the membrane and rejection of dextran by the membrane are not changed after the immersion testing under the two different conditions mentioned in Example 1.

From the results, it is apparent that the surface-treated, semipermeable membrane of the present invention is excellent in resistance to heat and organic solvents.

TABLE 2

| | semipermeable membrane not surface-treated | Example No. | | | |
|---|---|---|---|---|---|
| | | 2 | 3 | 4 | 5 |
| J | 2.3 | 0.9 | 0.9 | 2.0 | 2.5 |
| Jo | 9.9 | 1.9 | 1.7 | 4.1 | 5.5 |
| $J\eta/Jo\eta o$ | 0.26 | 0.52 | 0.58 | 0.54 | 0.45 |

J, Jo: ml/m · min · (kg/cm²) at 25° C.

Example 6

Substantially the same procedure as in Example 1 is repeated except that polyether-imide ULTEM1000 (manufactured and sold by General Electric Co., Ltd., U.S.A.) is used instead of a polysulfone, to thereby obtain a flat semipermeable membrane having a thickness of 0.1 mm. The water permeability of the thus obtained flat semipermeable membrane is 7.5 ml/min·cm²·(kg/cm²) at 25° C. The rejection of dextran by the flat semipermeable membrane is 5.2%.

Then, the thus obtained semipermeable membrane made of polyether-imide is subjected to surface treatment with propylene oxide in the presence of anhydrous aluminum chloride in substantially the same manner as in Example 1. The water permeability of the resultant surface-treated flat semipermeable membrane is 1.5 ml/min·cm²·(kg/cm²) at 25° C. The rejection of dextran by the membrane using a solution containing 5% by weight of dextran having a molecular weight of $1\times 10^4$ is 55%. The surface-treated, flat semipermeable membrane is then subjected to FT-IR spectrometry (ATR method). From the results, it is confirmed that a hydrophilic segment is bonded to the surface of the surface-treated, flat semipermeable membrane.

According to the method described in Example 1, the contact angle against water of the surface of the surface-treated, flat semipermeable membranes is measured. From the results, it is found that the surface of the surface-treated, flat semipermeable membrane obtained in Example 6 exhibits a contact angle against water of 60°. On the other hand, a dense film of a polyether-imide is prepared in substantially the same manner as in Example 1 except that the above-mentioned polyether-imide is used instead of a polysulfone. The contact angle of the surface of the dense film is measured in the same manner as in Example 1. From the results, the surface of the polyether-imide-made dense film is found to exhibit a contact angle against water of 70°.

Then, in order to compare the adsorptivities for organic substances of the surface-treated and non-treated semipermeable membranes, the $J\eta/Jo\eta o$ value is determined, with respect to each of the surface-treated, hollow fiber semipermeable membrane and the semipermeable membrane before the surface treatment, in substantially the same manner as in Example 1. The results are shown in Table 3.

TABLE 3

|   | semipermeable membrane not surface-treated | surface-treated semipermeable membrane |
|---|---|---|
| J | 1.9 | 0.8 |
| Jo | 7.5 | 1.5 |
| $J\eta/Jo\eta o$ | 0.28 | 0.59 |

J, Jo: ml/min · cm² · (kg/cm²) at 25° C.

As is apparent from the results, the surface-treated, semipermeable membrane of the present invention exhibits low adsorptivity for organic substances (i.e., polyethylene glycol) as compared to the semipermeable membrane which is not surface-treated.

Further, in order to examine the resistance to heat and organic substances of the surface-treated semipermeable membrane, the immersion testing is conducted in substantially the same manner as in Example 1. As a result, it is found that the contact angle against water of the surface of the surface-treated semipermeable membrane, water permeability of the membrane and rejection of dextran by the membrane are not changed after the immersion testing under the two different conditions mentioned in Example 1.

From the results, it is apparent that the surface-treated, semipermeable membrane of the present invention is excellent in resistance to heat and organic solvents.

Comparative Example 2

1.50 g of propylene oxide is added to 106 g of n-hexane which has been cooled a temperature of 5° C and, then, to the resultant solution is added 0.03 g of anhydrous aluminum chloride while stirring at 5° C, to thereby obtain a mixture for surface treatment. The temperature of the obtained mixture is increased to 18° C and, then, the dried poly-sulfone-made membrane obtained in Example 2 is treated with the above-obtained mixture in substantially the same manner as in Example 2, except that the temperature of the mixture and the time for surface treatment are changed to 18° C and for 20 sec, respectively, to thereby obtain a inner surface-treated, hollow fiber membrane. The above-obtained inner surface-treated, hollow fiber membrane is subjected to FT-IR spectrometry (ATR method). From the results, it is found that a hydrophilic segment is bonded to the inner surface of the membrane. Then, the contact angle against water of the inner surface of the membrane is measured in substantially the same manner as in Example 2. From the results, it is found that the inner surface of the membrane obtained in Comparative Example 2 exhibits a contact angle against water of 52°, which is only 3° smaller than the contact angle against water exhibited by the surface of the dense film prepared in Example 2, that is, 55°.

Using the above-obtained surface-treated membrane, the value of $J\eta/Jo\eta o$ is determined in substantially the same manner as in Example 1. From the results, it is found that the value of $J\eta/Jo\eta o$ is 0.27, which is almost the same as that obtained with respect to the membrane not surface-treated as shown in Table 1 in Example 1. Therefore, the adsorptivity for organic substances of the above-obtained membrane is not improved at all.

What is claimed is:

1. A surface-hydrophilic, highly selective semipermeable membrane comprising:
    a semipermeable membrane of a hydrophobic polymer containing aromatic rings in the main chain thereof; and
    a hydrophilic segment having at least one end directly bonded to the aromatic ring,
    said hydrophilic segment comprising moieties having properties of preventing adsorption of organic substances so as to avoid fouling of said membrane, including at least one methylene group or substituted methylene group which is positioned at least at said one end of the segment and at least one neutral hydroxyl group,
    said methylene group or substituted methylene group being represented by the formula:

wherein each of $R^1$ and $R^2$ independently represnets a hydrogen atom, a halogen atom, an alkyl group having 1 to 3 carbon atoms or a halogenated alkyl group having 1 to 3 carbon atoms,
    and wherein the surface having said hydrophilic segment bonded thereto exhibits a contact angle against water of at least 5° smaller than the contact angle exhibited by the surface of a dense film made of said hydrophobic polymer which does not contain said hydrophilic segment bonded thereto.

2. The semipermeable membrane according to claim 1, wherein said hydrophobic polymer is selected from the group consisting of a polysulfone, a polyether sulfone, a polyimide, a polyether imide, an aromatic polyamide, a polyamide-imide, a polyarylate, an aromatic polyether-ether ketone, a polyphenylene sulfide, a polyphenylene oxide and an aromatic polycarbonate.

3. The semipermeable membrane according to claim 1, wherein said semipermeable membrane is a hollow fiber semipermeable membrane.

4. The semipermeable membrane according to claim 1, wherein said hydrophilic segment has a structure represented by the formula:

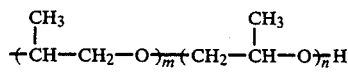

wherein m and n are each an integer of 0 or more with the proviso that $m+n \leq 1$.

5. A process for producing the surface-hydrophilic, highly selective semipermeable membrane of claim 1, which comprises treating at least one surface of a semipermeable membrane of a hydrophobic polymer containing aromatic rings in the main chain thereof with an epoxide in the presence of a Friedel-Crafts catalyst.

6. The process according to claim 5, wherein said polymer is selected from the group consisting of a polysulfone, a polyether sulfone, a polyimide, a polyether imide, an aromatic polyamide, a polyamide-imide, a polyarylate, an aromatic polyether-ether ketone, a polyphenylene sulfide, a polyphenylene oxide and an aromatic polycarbonate.

7. The process according to claim 5, wherein said epoxide is selected from the group consisting of ethylene oxide, propylene oxide, trimethylene oxide, ethylene glycol diglycidyl ether, diethylene glycol diglycidyl ether, polyethylene glycol diglycidyl ether, propylene glycol diglycidyl ether, glycerin polyglycidyl ether, trimethylolpropane polyglycidyl ether and neopentylglycol diglycidyl ether.

8. The process according to claim 5, wherein said semipermeable membrane is a hollow fiber semipermeable membrane.

* * * * *

UNITED STATES PATENT AND TRADEMARK OFFICE
CERTIFICATE OF CORRECTION

PATENT NO. : 4,948,508

DATED : August 14, 1990

INVENTOR(S) : Tsutomu Nakagawa et al.

It is certified that error appears in the above-identified patent and that said Letters Patent is hereby corrected as shown below:

at Column 5, line 7, change "$m + n \leq 1$" to --$m + n \geq 1$--, at Column 21, line 13, change "$m + n \leq 1$" to --$m + n \geq 1$--.

Signed and Sealed this

Twelfth Day of May, 1992

Attest:

DOUGLAS B. COMER

*Attesting Officer*       *Acting Commissioner of Patents and Trademarks*